(12) United States Patent
Lee

(10) Patent No.: US 8,049,837 B2
(45) Date of Patent: Nov. 1, 2011

(54) MULTILAYER FILM, BACKLIGHT UNIT AND LIQUID CRYSTAL DISPLAY HAVING THE SAME

(75) Inventor: Junghoon Lee, Cheongju-si (KR)

(73) Assignee: LG Electronics Inc., Seoul (KR)

( * ) Notice: Subject to any disclaimer, the term of this patent is extended or adjusted under 35 U.S.C. 154(b) by 111 days.

(21) Appl. No.: 12/303,370

(22) PCT Filed: Jun. 4, 2007

(86) PCT No.: PCT/KR2007/002689
§ 371 (c)(1),
(2), (4) Date: Dec. 4, 2008

(87) PCT Pub. No.: WO2007/142438
PCT Pub. Date: Dec. 13, 2007

(65) Prior Publication Data
US 2009/0167986 A1    Jul. 2, 2009

(30) Foreign Application Priority Data
Jun. 5, 2006 (KR) .................. 10-2006-0050502

(51) Int. Cl.
*G02F 1/1335* (2006.01)
(52) U.S. Cl. ..................... 349/64; 362/606; 362/607
(58) Field of Classification Search ............. 349/64; 362/606, 607
See application file for complete search history.

(56) References Cited

U.S. PATENT DOCUMENTS

| 6,771,335 | B2 * | 8/2004 | Kimura et al. | 349/112 |
| 7,354,163 | B2 * | 4/2008 | Suzuki et al. | 359/601 |
| 2003/0147140 | A1 * | 8/2003 | Ito | 359/599 |
| 2006/0209404 | A1 * | 9/2006 | Kim et al. | 359/453 |

FOREIGN PATENT DOCUMENTS

| JP | 2001-066404 | 3/2001 |
| JP | 2001-166114 | 6/2001 |
| JP | 2004-341294 | 12/2004 |
| JP | 2005-107108 | 4/2005 |
| KR | 10-2005-0116575 A | 12/2005 |
| KR | 10-2007-0041348 A | 4/2007 |

OTHER PUBLICATIONS

Korean Office Action dated Nov. 29, 2007.
International PCT Search Report and Written Opinion dated Sep. 10, 2007.

* cited by examiner

*Primary Examiner* — Richard H Kim
(74) *Attorney, Agent, or Firm* — KED & Associates, LLP

(57) ABSTRACT

The present invention is directed to a multilayer film. The present invention is also directed to a backlight unit and a liquid crystal display into which the multilayer film is incorporated. The backlight unit comprises a light source; and a multilayer film disposed adjacent to the light source, wherein the multilayer film comprises a first layer including a plurality of first particles and at least one second layer including a plurality of second particles, and wherein the second layer is disposed adjacent to the first layer and has a refractive index different from the first layer. The liquid crystal display comprises a liquid crystal panel; a light source; and a multilayer film disposed adjacent to the light source, wherein the multilayer film comprises a first layer including a plurality of first particles and at least one second layer including a plurality of second particles, and wherein the second layer is disposed adjacent to the first layer and has a refractive index different from the first layer.

16 Claims, 2 Drawing Sheets

[Fig. 1]
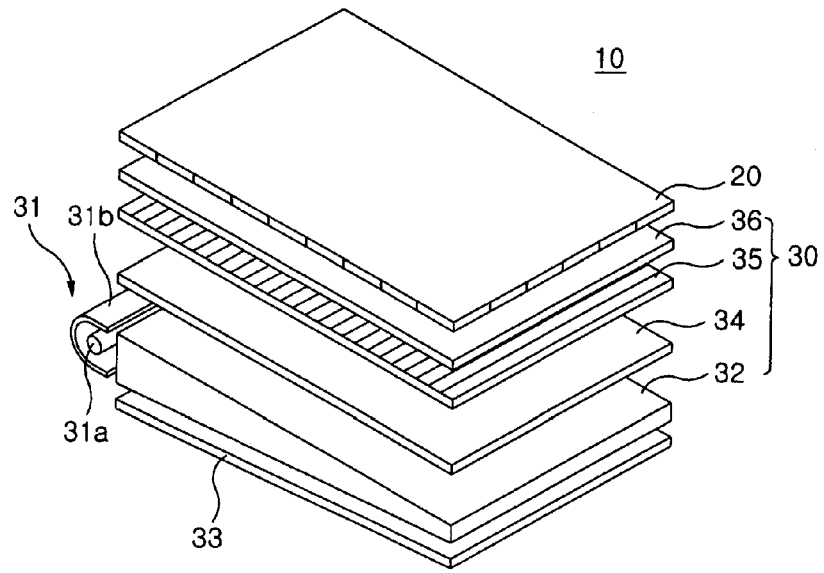
[Fig. 2]
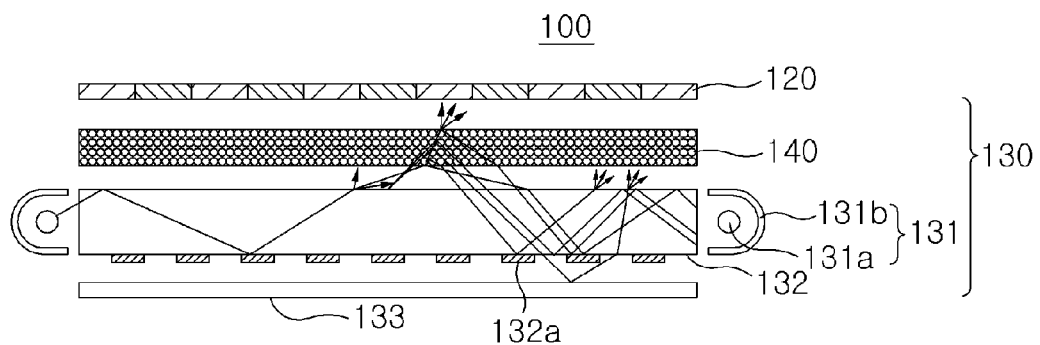
[Fig. 3]
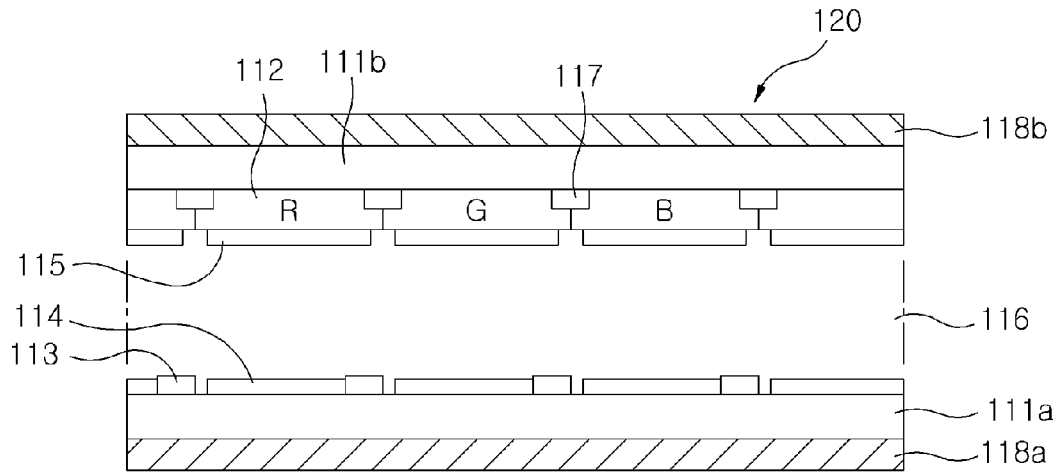

[Fig. 4]
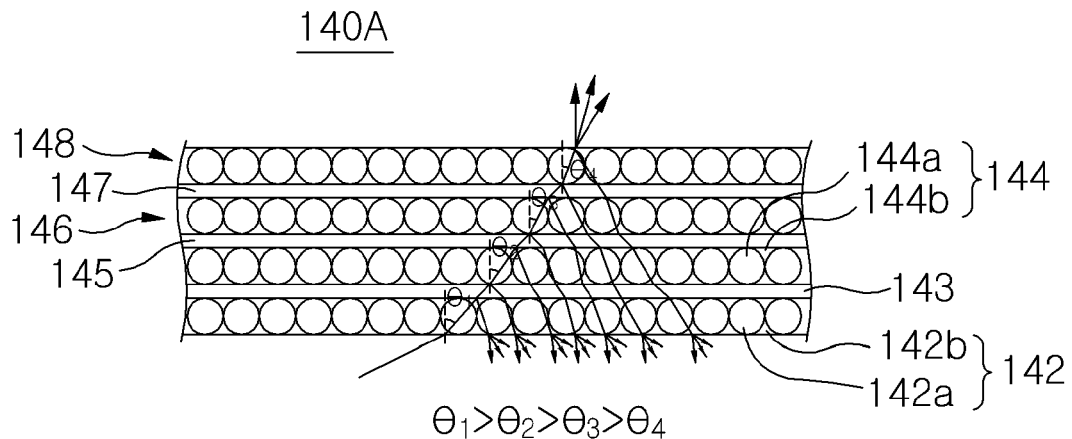
[Fig. 5]
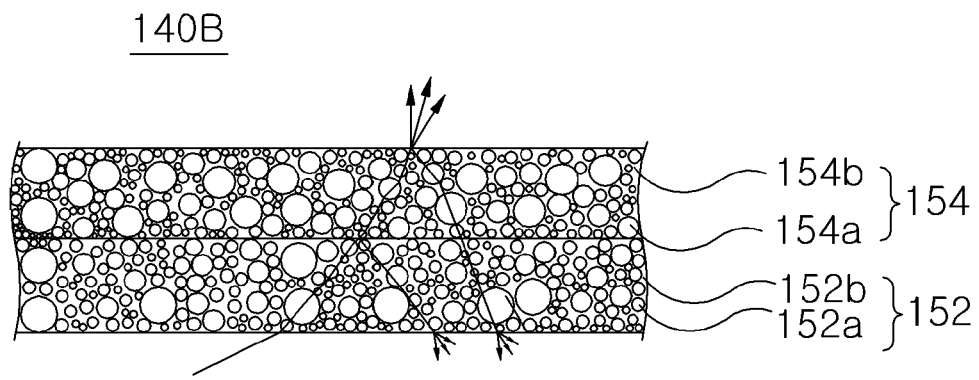
[Fig. 6]
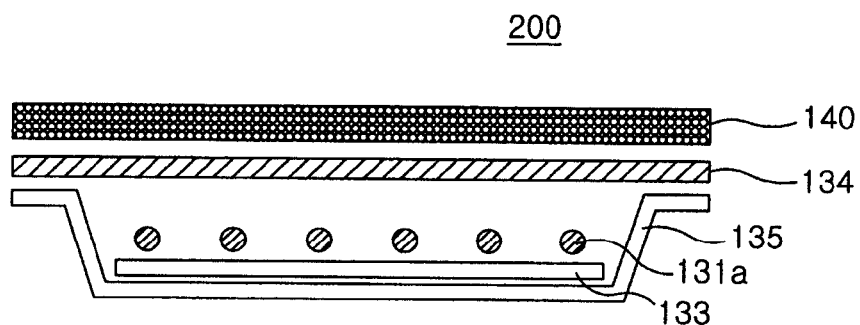

MULTILAYER FILM, BACKLIGHT UNIT AND LIQUID CRYSTAL DISPLAY HAVING THE SAME

CROSS-REFERENCE TO A RELATED APPLICATION

The present application claims the benefit of priority under 35 U.S.C. 119 based on the Korean Patent Application No. 10-2006-0050502 filed on Jun. 5, 2006. This application is incorporated herein by reference in its entirety.

BACKGROUND

1. Field of the Invention

The present invention is directed to a multilayer film. The present invention is also directed to a backlight unit and a liquid crystal display into which the multilayer film is incorporated.

2. Background

Liquid crystal display, also known as LCD, is an electronic device that transforms electrical signals into visual signals by utilizing change of transmittance of liquid crystals according to applied voltages.

As is well known in the art, liquid crystal display is a non-emitting display device. Thus, liquid crystal display needs to use an external light source unit for illuminating a viewing plane of a liquid crystal panel from outside in order to display visual information. Hereinafter, a conventional liquid crystal display is described in detail with reference to the figures.

FIG. 1 is a perspective view illustrating a liquid crystal display.

Referring to FIG. 1, the liquid crystal display 10 comprises a liquid crystal panel 20 and a backlight unit 30 disposed at backside of the liquid crystal panel. The liquid crystal panel 20 receives a light provided by the backlight unit 30 to display images.

In general, the liquid crystal panel 20 comprises a pair of transparent substrates, a liquid crystal layer inserted between transparent substrates, a color filter, black matrix, a pixel electrode, a common electrode, and a TFT array.

The backlight unit 30 comprises a light source unit 31, a light guide plate 32, a reflector 33, and optical sheets 34, 35 and 36.

The conventional liquid crystal display 10 comprises optical sheets 34, 35 and 36. The optical sheets 34, 35 and 36 may comprise a diffuser sheet 34, a prism sheet 35, and a reflective polarizer film 36.

However, the conventional liquid crystal display has a disadvantage to use a plurality of optical sheets, thereby increasing the manufacturing cost. Another disadvantage is that the display's quality is decreased by thermal deformation of the optical sheet when a heat generated from the light source is transmitted to the optical sheet. Also, the prism sheet may be deformed easily by outer shock, and so should be handled carefully.

BRIEF DESCRIPTION OF THE DRAWINGS

These and other features, aspects and advantages of the present invention will be understood better with regard to the following descriptions, appended claims, and accompanying drawings where:

FIG. 1 is a perspective view illustrating a liquid crystal display;

FIG. 2 is a cross-sectional view illustrating a liquid crystal display according to one embodiment of the present invention;

FIG. 3 is a cross-sectional view illustrating the liquid crystal panel of FIG. 2;

FIG. 4 is a partial sectional view illustrating a multilayer film according to one embodiment of the present invention;

FIG. 5 is a partial sectional view illustrating a multilayer film according to another embodiment of the present invention; and FIG. 6 is a cross-sectional view illustrating a backlight unit according to another embodiment of the present invention.

DETAILED DESCRIPTION OF THE INVENTION

An object of the present invention is to provide a multilayer film that enhances brightness.

Another object of the present invention is to provide a multilayer film that transmits a certain polarized light, and re-uses the other light by reflection, thereby increasing the light efficiency.

Further, another object of the present invention is to provide a multilayer film having thermally and mechanically stable structure.

Still further, another object of the present invention is to provide a backlight unit and a liquid crystal display into which the multilayer film is incorporated.

The scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

In the following drawings, the same reference numbers will be used to refer to same or similar parts through all embodiments. In addition, the detailed descriptions of identical parts are not repeated.

FIG. 2 is a cross-sectional view illustrating a liquid crystal display according to one embodiment of the present invention. FIG. 3 is a cross-sectional view illustrating the liquid crystal panel of FIG. 2.

Referring to FIG. 2, the liquid crystal display 100 of the present invention comprises a liquid crystal panel 120 and a backlight unit 130. The liquid crystal display 100 displays images according to driving signals and data signals provided by an external device.

To understand and work the present invention, it is not important to describe the detailed structure of the liquid crystal panel 120. And, the idea of the present invention is widely applicable to any type of liquid crystal panel usually employed in the liquid crystal display. Therefore, the structure of the liquid crystal panel 120 is provided as one example.

Referring to FIG. 3, the liquid crystal panel 120 comprises a lower substrate 111a, an upper substrate 111b, a color filter 112, a black matrix 117, a pixel electrode 114, a common electrode 115, a liquid crystal layer 116, and a TFT array 113. And, a lower polarizer film 118a, and an upper polarizer film 118b are disposed on both surfaces of the liquid crystal panel 120.

The color filter 112 comprises red (R), green (G) and blue (B) color filters displaying red, green and blue images, respectively.

The TFT 113 array is a switching element, and switches the pixel electrode 114.

The common electrode 115 and the pixel electrode 114 convert an array of molecules of the liquid crystal layer 116 according to a certain voltage applied thereto from outside.

The liquid crystal layer 116 comprises a plurality of liquid crystal molecules, and an array of the liquid crystal molecules is converted according to a voltage gap generated from the pixel electrode 114 and the common electrode 115, whereby a light provided from the backlight unit 130 is inputted to the color filter 112 in correspondence to change of molecule array in the liquid crystal layer 116.

The polarizer film 118a and 118b includes a dichroic dye which absorbs a certain polarized light. Generally, a transmission axis of the lower polarizer film 118a crosses a transmission axis of the upper polarizer film 118b, and the cross angle may be in the range of 0° to 90°.

Referring to FIG. 2 again, the backlight unit 130 comprises a light source unit 131, a light guide plate 132, a reflector 133, and a multilayer film 140.

The backlight unit 130 according to one embodiment of the present invention is an edge-light type in which a light source unit 131 is disposed at both side surfaces of the light guide plate 132.

The light source unit 131 supplying a light to the liquid crystal panel 120 comprises a pair of light sources 131a, and a light source reflector 131b surrounding each light source.

A cold cathode fluorescent lamp (CCFL) or an external electrode fluorescent lamp (EEFL) may be used as the light source 131a.

Also, the light source 131a may be a light emitting diode (LED). The backlight unit using the LED is disclosed in Korean Laid-open Patent Publication No. 10-2005-0113419, Japan Laid-open Patent Publication No. 2004-79488, etc., and these publications will be incorporated herein by reference.

In case the LED is used as the light source 131a, a number of LEDs to be installed may be selected properly according to a size of the liquid crystal panel 120.

The kind of LED is not limited, and one white LED may be used, or a combination of three LEDs which emit each of red (R), green (G), and blue (B) lights may be used.

The light source reflector 131b is disposed outside the light source 131a, and may be made up of metal or plastic. An inner-surface of the light source reflector 131b is coated with a material having high reflexibility so as to reflect a light emitted from the light source 131a into the light guide plate 132.

The light emitted from the light source 131a is inputted to the liquid crystal panel 20, and the light source reflector 131b enhances the light efficiency by inputting the light emitted from the light source 131a to the light guide plate 132.

The light guide plate 132 comprises a first surface which is disposed in the vicinity of the light source 131a, and to which the light from the light source unit 131 is inputted, and a second surface which is disposed substantially in parallel with the multilayer film 140 and through which the light transmitted from the first surface is outputted.

The light guide plate 132 is disposed in the vicinity of the light source 131a and the light emitted from the light source 131a is guided to be incident into the liquid crystal panel 120.

To do so, a light scattering pattern may be formed on one surface facing the second surface of the light guide plate 132 by a method of dot-printing.

Or, a non-printing light guide plate may be used. A non-printing light guide plate having a light scattering pattern by forming grooves on the light guide plate is disclosed in U.S. Pat. No. 6,123,431. A non-printing light guide plate having a function of diffusion plate by dispersing inorganic particles or organic particles having different refractive index from a base resin therein is disclosed in U.S. Pat. No. 5,881,201. These publications will be incorporated herein by reference.

The light guide plate 132, for example, may be made up of a transparent acryl resin such as polymethyl methacrylate (PMMA).

The reflector 133 is disposed at a lower surface of the light guide plate 132, reflects the light outputted from the lower surface of the light guide plate 132, and re-inputs it to the light guide plate 132, thereby improving the light efficiency.

The reflector 133 may be manufactured by applying Ag on a sheet made of SUS, Brass, Al, PET, etc and coating it with Ti to prevent thermal deterioration caused by heat absorption.

Alternatively, the reflector 133 may be obtained by dispersing micro-pores capable of scattering a light in a resin sheet such as PET.

The backlight unit 130 according to one embodiment of the present invention comprises a multilayer film 140 disposed between the light guide plate 132 and the liquid crystal panel 120. The multilayer film 140 enhances the brightness by refracting an incident light emitted from the light guide plate 132 toward a viewing plane of the liquid crystal panel 120, and makes the brightness uniform through the whole viewing plane of the liquid crystal panel 120.

Also, the multilayer film 140 of the present invention transmits a polarized light, and reflects a light vertical to the polarized light toward the light guide plate 132. That is, among the light transmitted from the light guide plate 132, a polarized light may pass through the multilayer film 140, and the other is reflected.

For example, assuming that a certain polarized light is a P wave, and the other polarized light is a S wave, the P wave may pass the multilayer film 140, and the S wave may reflect from the multilayer film 140 because a multilayer film 140 of the present invention is laminated with a plurality of layers having different refractive indices. And, the reflected S wave may convert to a light comprising a P wave and an S wave while passing through the light guide plate 132 and a reflector 133. Then, the converted light may be re-inputted into the multilayer film 140, and the P wave may pass the multilayer film 140, and the S wave may reflect from the multilayer film 140 again.

Hereinafter, a multilayer film 140 of the present invention will be described in detail with reference to the figures.

FIG. 4 is a partial sectional view illustrating a multilayer film according to one embodiment of the present invention. FIG. 5 is a partial sectional view illustrating a multilayer film according to another embodiment of the present invention.

Referring to FIG. 4, a multilayer film 140A of the present invention comprises first layer 142, second layer 144, and middle layer 143, and have a structure in which the first layer 142, middle layer 143 and second layer 144 are accumulated alternately and repeatedly. The diffraction index of the first layer 142 is different from that of the second layer 144.

The first layer 142 comprises a plurality of first particles 142a having substantially same size and transmitting a light, and a first binder 142b fixing the first particles 142a. The first particles 142a may be beads. And, the beads may be circular.

The first particles 142a have a size in the range of about 5 μm and about 20 μm and are disposed in the first binder densely. These first particles 142a may operate as an optical lens in the first layer 142, and refract a light toward a vertical direction to the first layer 142.

The middle layer 143 is disposed between the first layer 142 and the second layer 144, and flattens the surface of the first layer 142. The middle layer 143 operates as adhesive layer which joins the first layer 142 and the second layer 144.

Preferably, the middle layer 143 is made of a material having the refraction index close to 1.

The second layer 144 comprises a plurality of second particles 144a having substantially same size and transmitting a light, and a second binder 144b fixing the second particles 144a. The second particles 144a may be beads. And, the beads may be circular. Here, the refraction index of the second binder 144b of the second layer 144 may be different from that of the first binder 142b of the first layer 142.

The second particles 144a have a size in the range of about 5 µm and about 20 µm, and are disposed in the second binder 144b densely. The refraction index of the second particles 144a of the second layer 144 may be different from that of the first particles 142a of the first layer 142. These second particles 144a may operate as an optical lens in the second layer 144, and refract a light toward a vertical direction to the second layer 144.

Another first layer 146 having the same structure as the above first layer 142 is disposed on the second layer 144, and another second layer 148 having the same structure as the above second layer 144 is disposed on the first layer 146. Also, the middle layers 143, 145 and 147 are disposed between the first layer 142 and 146 and the second layer 144 and 148.

As described above, the first particles 142a and the second particles 144a operate as a sort of optical lens, and condense and/or diffuse a light toward the vertical direction to the liquid crystal panel 120.

Therefore, as shown in FIG. 4, the light passing through the first layer 142 and 146 and the second layer 144 and 148 is refracted toward the vertical direction to the front side of the multilayer film 140A ($\theta_1 > \theta_2 > \theta_3 > \theta_4$). Due to this condensing effect, the multilayer film 140A of the present invention may substitute the prism sheet 35 as shown in FIG. 1.

Referring to FIG. 5, a multilayer film 140B of the present invention comprises a first layer 152 and a second layer 154. And, the first layer 152 and the second layer 154 may be accumulated alternately and repeatedly. The diffraction index of the first layer 152 is different from that of the second layer 154.

The first layer 152 comprises a plurality of first particles 152a capable of transmitting a light, and a first binder 152b fixing the first particles 152a. The first particles 152a may be beads. And, the beads may be circular.

The first particles 152a have various sizes in the range of about 5 µm and about 20 µm, and are disposed in the first binder 152b densely. These first particles 152a operate as optical lens in the first layer 152, and refract a light toward the vertical direction to the first layer 152.

The second layer 154 comprises a plurality of second particles 154a capable of transmitting a light, and a second binder 154b fixing the second particles 154a. The second particles 154a may be beads. And, the beads may be circular. Here, the refraction index of the second binder 154b of the second layer 154 may be different from that of the first binder 152b of the first layer 152.

The second particles 154a have various sizes in the range of about 5 µm and about 20 µm, and are disposed in the second binder 154b densely. The refraction index of the second particles 154a of the second layer 154 may be different from that of the first particles 152a of the first layer 152. These second particles 154a operate as optical lens in the second layer 154, and refract a light toward the vertical direction to the second layer 154.

In one embodiment of the present invention, the first layer 142, 146 and 152 has a different refraction index from the second layer 144, 148 and 154. Preferably, the refraction index of the first layer 142 and 146 is lower than that of the second layer 144 and 146. Thus obtained multilayer film 140A and 140B has a structure in which a layer having a lower refractive index and a layer having a relatively higher refractive index are accumulated alternately and repeatedly. The repeated difference of the refraction index makes a light vibrating to certain polarized direction pass through the multilayer film 140A and 140B, and reflect the other light for re-use, whereby the multilayer film 140A and 140B of the present invention may substitute the reflective polarizer film.

The backlight unit as shown in FIG. 1 comprises a separate diffusion sheet 34 to widen the angle of view, and hide the pattern formed on the bottom surface of the light guide plate 32. However, the first layer 142, 146 and 152 and the second layer 144, 148 and 154 of the present invention can scatter the incident light, and so such separate diffusion sheet may not need in the present invention.

The multilayer film 140A and 140B of the present invention has a multilayer structure, and so has enhanced heat-resisting property and dynamic stability.

The technical idea of the present invention is not limited to the structure of the backlight unit 130 as shown in FIG. 2. That is, in FIG. 2, the backlight unit 130 to illuminate the liquid crystal display from backside is an edge-light type in which a light generated from the light source 131a is inputted through both side surfaces of the light guide plate 132. However, the idea of the present invention is applicable to a direct-type backlight unit, as show in FIG. 6.

FIG. 6 is a cross-sectional view illustrating a backlight unit according to another embodiment of the present invention.

Referring to FIG. 6, the backlight unit 200 comprises a plurality of light sources 131a, a reflector 133, a bottom chassis 135, a diffusion plate 134 and a multilayer film 140.

A cold cathode fluorescent lamp (CCFL) or an external electrode fluorescent lamp (EEFL) may be used as the light source 131a.

The light source 131a may consist of a light emitting diode (LED).

The reflector 133 is disposed under the light source 131a, and the reflector 133 enhances the light efficiency by reflecting a light generated from the light source 131a toward the liquid crystal panel (not shown).

The bottom chassis 135 accepts the light source 131a and the reflector 133.

The light generated from the light source 131a is inputted to the diffusion plate 134. The diffusion plate 134 is made up of, for example, transparent acryl such as polymethyl methacrylate (PMMA), and includes diffuser such as beads, whereby the light generated from the light source 131a proceeds toward the liquid crystal panel.

The multilayer film 140 as described above is disposed on the diffusion plate 134.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A backlight unit comprising:
a light source; and
a multilayer film disposed adjacent to the light source,
wherein the multilayer film comprises at least one first layer including a plurality of first particles and at least one second layer including a plurality of second particles, and wherein the second layer is disposed adjacent to the first layer and has a refractive index that is higher than a refractive index of the first layer, wherein the first and second layers are accumulated alternately and repeatedly,
wherein at least one adhesive layer is disposed between the first layer and the second layer, the adhesive layer having a thickness that is less than a thickness of the first layer and the second layer,
wherein the first layer includes first binders and the second layer includes second binders, wherein the first binder and the second binder have different refractive indices, and
wherein the first and second particles are beads having substantially a same size in the first and second layers.

2. The backlight unit of claim 1, wherein the beads are circular.

3. The backlight unit of claim 1, wherein the at least one adhesive layer has a refractive index close to 1.

4. The backlight unit of claim 3, wherein the first layer, the at least one adhesive layer and the second layer are accumulated alternately and repeatedly.

5. The backlight unit of claim 1, wherein the first and second particles have a size in a range from about 5 µm to about 20 µm.

6. The backlight unit of claim 1, wherein the first and second particles have various sizes.

7. The backlight unit of claim 1, further comprising a light guide plate that comprises a first surface disposed in a vicinity of the light source and accepting a light from the light source, and a second surface disposed substantially in parallel with the multilayer film, and through which the light transmitted from the first surface is outputted.

8. The backlight unit of claim 1, wherein the first and second particles have different refractive indices.

9. The backlight unit of claim 1, wherein the first layer is disposed closer to the light source than the second layer.

10. A liquid crystal display comprising:
a liquid crystal panel;
a light source; and
a multilayer film disposed adjacent to the light source,
wherein the multilayer film comprises at least one first layer including a plurality of first particles and at least one second layer including a plurality of second particles, and wherein the second layer is disposed adjacent to the first layer and has a refractive index that is higher than a refractive index of the first layer, wherein the first and second layers are accumulated alternately and repeatedly,
wherein at least one adhesive layer is disposed between the first layer and the second layer, the adhesive layer having a thickness that is less than a thickness of the first layer and the second layer,
wherein the first layer includes first binders and the second layer includes second binders, wherein the first and second binders have different refractive indices, and
wherein the first and second particles are beads having substantially a same size in the first and second layers.

11. The liquid crystal display of claim 10, wherein the beads are circular.

12. The liquid crystal display of claim 10, wherein the at least one adhesive layer has a refractive index close to 1.

13. The liquid crystal display of claim 12, wherein the first layer, the at least one adhesive layer and the second layer are accumulated alternately and repeatedly.

14. The liquid crystal display of claim 10, wherein the first and second particles have a size in a range from about 5 µm to about 20 µm.

15. The liquid crystal display of claim 10, wherein the first and second particles have various sizes.

16. The liquid crystal display of claim 10, further comprising a light guide plate that comprises a first surface disposed in a vicinity of the light source and accepting a light from the light source, and a second surface disposed substantially in parallel with the multilayer film, and through which the light transmitted from the first surface is outputted.

* * * * *